UNITED STATES PATENT OFFICE.

GEORGE EDGAR HAGERMAN, OF BROOKLYN, NEW YORK.

ARTIFICIAL STONE.

SPECIFICATION forming part of Letters Patent No. 454,346, dated June 16, 1891.

Application filed May 19, 1890. Serial No. 352,384. (Specimens.)

*To all whom it may concern:*

Be it known that I, GEORGE EDGAR HAGERMAN, a citizen of the United States, residing in the city of Brooklyn, county of Kings, and State of New York, have invented certain new and useful Improvements in Artificial Stone, of which the following is a specification.

The base of said stone is sand or rock, which is reduced to a molten state by heat in any suitable furnace or receptacle. The substance is melted sufficiently to run into molds, and during the process of melting shell lime or other similar material is added to the mass for the purpose of preventing the formation of a hard coat or crust on the inner side of the heating-receptacle. The substance is run or drawn from said receptacle into molds, and while in a molten state I mix with it other substances to give the stone when finished requisite qualities and color. I mix with the molten mass other substances, such as unmelted sand, earth, pulverized rock, gravel, and any suitable coloring-matter. The coloring material may be mixed with the molten mass in the heating-receptacle. The addition of these substances cheapens the cost of production and gives the stone any desirable degree of hardness and tenacity. The coloring-matter gives the stone when finished any desired color. The manner of mixing these substances with the molten sand may vary according to circumstances; but it is done by preference after the melted sand passes out of said receptacle. It may be done as the melted sand is running into the molds or immediately thereafter. It must be done before the molten mass cools. A portion of the unmelted substance may be placed in the molds before the molten mass runs out of the heating-receptacle.

The material in the mold after the mixture is completed is subjected to sufficient pressure to give the completed stone the requisite degree of hardness, tenacity, and smoothness of surface.

By a proper construction of the mold the surface of the stone may be made of any desired shape or configuration. They may be made plain for paving and building or highly ornamental in shape for various purposes without increasing the cost of production, and of divers colors.

The cost of these stones will be less than ordinary paving-stones and less than the cost of bricks used for building. They are admirably adapted for all the purposes of which stone and brick are now used, and much handsomer structures may be erected at the same cost.

The principal advantage of my invention lies in mixing fresh sand with molten sand as the latter comes from the furnace, so as to cool the molten mass and impart to it the substance and quality of stone.

I am aware that it is not new to produce artificial stone consisting of slag to which when in a fluid state is added sand, lime, and burned clay, first heated to redness; also, stone composed of slag to which silica and alumina are added, the latter being made as hot as possible before being mixed or incorporated with the slag, and, also, stone composed of melted slag or metal to which is added pulverized flint. My invention differs from the above in, first, that the base of the article consists of sand or rock reduced to a molten state, and slag is not employed, and, secondly, in that fresh sand is mixed with the molten sand or rock as the latter comes from the furnace, whereby the same is cooled and given the substance and quality of stone. The advantage of using sand or rock reduced to a molten state in preference to slag is that, the latter being a burned-out or partially burned-out material, the heat required to melt the same is much greater than that necessary to melt sand or crushed rock. It is necessary to always use some adhesive material when slag is employed, and the latter is porous, absorbent, and otherwise inferior to a base of molten sand or rock. The article produced by my invention will not crumble, nor is it affected by frost, and it is much more durable than a stone having slag for its base. The advantages of adding cold sand instead of heated sand to the molten sand or rock consists, principally, in that a superior product is obtained, and the cost of manufacture is greatly lessened, since heating of the sand is avoided, and the process is greatly expedited, as the effect of the cold sand is to rapidly cool the molten mass.

Having described my invention, what I desire to claim and secure by Letters Patent is—

The herein-described process or method of making artificial stone, consisting of the reduction of sand or rock to a molten state, running the molten mass into molds, and mixing therewith fresh sand to impart thereto the substance and quality of stone, as set forth.

GEORGE E. HAGERMAN.

Witnesses:
JAMES M. TULLY,
S. W. WOOD.